United States Patent
Dujardin et al.

(10) Patent No.: US 6,929,842 B2
(45) Date of Patent: Aug. 16, 2005

(54) EDGE GUARD

(75) Inventors: Rene Dujardin, Raeren (BE); Jean-Pierre Mayeres, Eupen (BE)

(73) Assignee: NMC, S.A., Raeren (BE)

( * ) Notice: Subject to any disclaimer, the term of this patent is extended or adjusted under 35 U.S.C. 154(b) by 0 days.

(21) Appl. No.: 10/432,649

(22) PCT Filed: Nov. 27, 2001

(86) PCT No.: PCT/EP01/13802

§ 371 (c)(1),
(2), (4) Date: May 23, 2003

(87) PCT Pub. No.: WO02/42121

PCT Pub. Date: May 30, 2002

(65) Prior Publication Data

US 2004/0022997 A1 Feb. 5, 2004

(30) Foreign Application Priority Data

Nov. 27, 2000 (EP) .............................................. 00125938

(51) Int. Cl.$^7$ ................................................. B32B 3/26
(52) U.S. Cl. ....................................... 428/122; 293/126
(58) Field of Search .............................. 428/122, 40.1, 428/42.2; 248/345.1; 293/126, 128

(56) References Cited

U.S. PATENT DOCUMENTS

| | | | | |
|---|---|---|---|---|
| 4,246,303 A | * | 1/1981 | Townsend | ..................... 428/31 |
| 4,817,335 A | | 4/1989 | Adell | |
| 5,065,972 A | * | 11/1991 | Buckshaw et al. | ....... 248/345.1 |

FOREIGN PATENT DOCUMENTS

| | | |
|---|---|---|
| EP | 0 233 552 | 8/1987 |
| FR | 2 584 028 | 1/1987 |
| FR | 2 728 036 | 6/1996 |
| PT | 101 685 | 11/1996 |

* cited by examiner

Primary Examiner—Alexander S. Thomas
(74) Attorney, Agent, or Firm—Melvin I. Stoltz

(57) ABSTRACT

Disclosed is a removable edge guard (10) for installation close to an edge of a vehicle door or the like. The edge guard is made of polymeric material for removable installation on a vehicle door having a trim. The edge guard (10) comprises:—a bumper (12) section and—two planar sections (14), each adjoining said bumper section,—said bumper section (12) comprising a U-shaped portion conceived to bridge said trim of said vehicle door and extending laterally over said edge of said vehicle door,—said planar sections (14) comprising means to removably install said guard on said edge of said vehicle door.

5 Claims, 2 Drawing Sheets

EDGE GUARD

TECHNICAL FIELD

This invention relates generally to protective guards for surface edges. Specifically, this invention relates to an edge guard for removable installation on the edge of a vehicle door, bumpers or the like.

BACKGROUND

It is becoming increasingly time consuming and expensive to repair even minor damage to the exterior body of automotive vehicles. As a result, manufacturers are interested in protecting automotive vehicles from all types of such damage prior to the delivery of the vehicle to the final customer. This concerns especially minor dents or scratches to the edges of vehicle doors, hoods, or trunks, which can occur during shipment of the vehicles.

The manufactures equip the doors or bumpers of the vehicle with a horizontal trim made of resilient material that is permanently fixed along the side of the doors of the vehicles so as to avoid dents and scratches when the doors are opened and bumped against a neighboring vehicle or another obstacle. These trims are however rather fragile and customers do not accept any damages in the paint when buying a new car.

It is therefore necessary for the manufactures to protect the body panels of the cars during the shipment form the factory to the customers. During this shipment f.ex. by truck, train or ship the cars are parked very close to one another. On the trucks or the trains, the space between the cars and the body of the truck or the train is very narrow so that dents or scratches in the doors of the vehicle during shipment are quite frequent.

A variety of devices have been developed for permanent installation on the edge of vehicle doors or the like. These devices generally comprise a deformable metal carrier coated with rubber or plastic materials as in U.S. Pat. No. 4,581,807. These devices generally have a U-shaped cross section for receiving the edge of the vehicle door. The metal carrier is generally deformed so that the device resiliently grips the edge of the vehicle door.

These prior art devices are generally designed with metal carriers so that they may be permanently affixed to the edge of the vehicle door. They are designed for permanent installation because they are generally used as decorative trim or for installation of weather stripping around the edge of the vehicle door as in U.S. Pat. No. 4,232,081 and U.S. Pat. No. 4,902,549. Once installed, these devices are difficult to remove without damaging the edge of the vehicle door. Moreover, when used as decorative trim or for installation of weather stripping, these devices generally must be of sufficient length to cover the entire edge of the vehicle door.

A disadvantage of these edge protectors is the doors of the vehicle have to be opened in order to install the edge protectors.

SUMMARY OF THE INVENTION

It is therefore an object of the invention to provide an edge protector for a vehicle door or the like providing maximum protection at strategic locations.

The ideal edge protector for a vehicle door or the like must be capable of being rapidly installed and removed without having to open the doors of the vehicle and without damaging the edge of the vehicle door.

According to the present invention, an edge guard for protection of a vehicle door or the like is disclosed.

More specifically, an edge guard of polymeric material for removable installation on a vehicle door having a trim is disclosed, said edge guard comprising:

a bumper section and two planar sections, each adjoining said bumper section, said bumper section comprising a U-shaped tunnel conceived to bridge said trim of said vehicle door and extending over said edge of said vehicle door along the length of said edge guard, said planar sections comprising means to removably install said guard on said edge of a vehicle door.

It is understood that although the edge protector is primarily designed for the protection of the edge of a vehicle door, it can also be used to protect the bumpers and other exposed parts of body panels of vehicles.

According to a first preferred embodiment said means to removably install said guard on said edge of a vehicle door comprise an adhesive material.

Preferably, said means to removably install said guard on said edge of a vehicle door comprise a double backed adhesive tape.

According to another preferred embodiment, said edge guard is formed from a resilient, low-density polymeric material. A variety of polymeric materials may be used including polyurethane, polytherephthlate, polyvinylchloride, polystyrene, polyolefines, their copolymers and mixtures thereof. Low density polyethylene foam is particularly well suited for this application.

These and other objects and advantages will be apparent after consideration of the following detailed description and drawings.

DETAILED DESCRIPTION OF THE DRAWINGS

Figure 1:
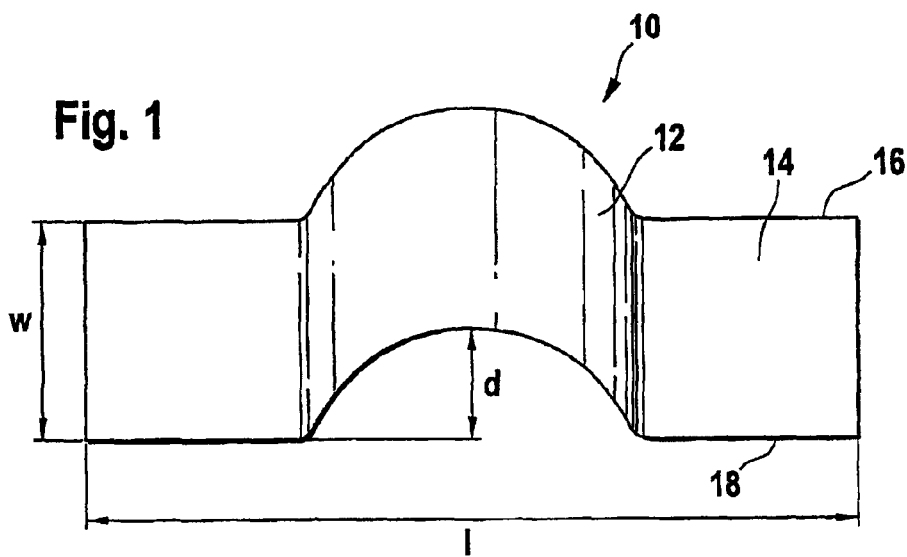
FIG. 1 is a top view of the edge guard.
Figure 2:
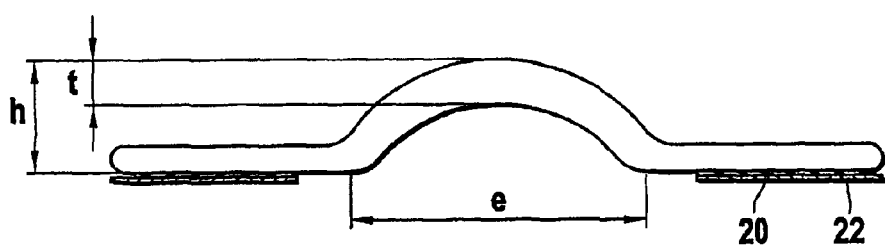
FIG. 2 is a cross-sectional view of the edge guard.
Figure 3:
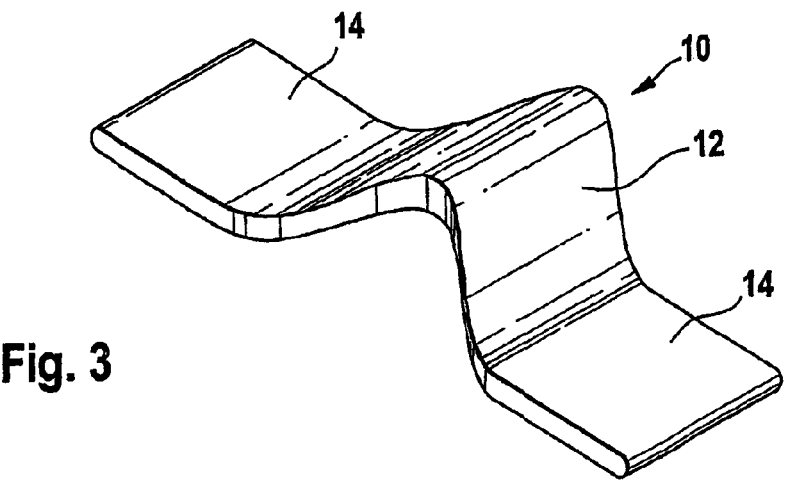
FIG. 3 is a perspective view of the edge guard

Referring now to FIGS. 1–3, a preferred embodiment of the edge guard 10 of the present invention is pictured. The edge guard 10 comprises a bumper portion 12, two planar sections 14, one on one side of the bumper portion 12 and the other on the opposite side of the bumper section 12, said planar sections 14 adjoining to said bumper section 12.

The planar sections 14 are located in a plane whereas the bumper section 12 is curved in two directions. The bumper section 12 is firstly curved in a direction perpendicular to the plane formed by the two planar sections. It extends in a generally U-shaped cross-section formed by a section of a cylinder so as to bridge the trim of the vehicle door. The open end of the U-shaped channel has a width, e, of 50–90 mm. The U-shaped part of the bumper section has a height h, of 25–35 mm. The thickness t of the material at that location is about 10–15 mm.

Secondly, the bumper section 12 is also curved in the plane formed by the two planar sections 14. The bumper section 12 has a crescent shape. On the one side, the bumper section extends laterally over the line formed by the first edge 16 of the two planar sections whereas on the opposite side, the bumper section 12 extends laterally inside the line formed by the edge 18 of the opposite sides of the planar sections. The distance d is about 25–35 mm.

When the edge guard 10 is fixed on the vehicle door, close to the edge of the said door, the crescent shape of the bumper section 12 allows at least part of the bumper section to extend laterally over the edge of the door. When the door is opened, the crescent shaped bumper section protects the edge of the door since it extends over the edge of the door.

Figure 4:
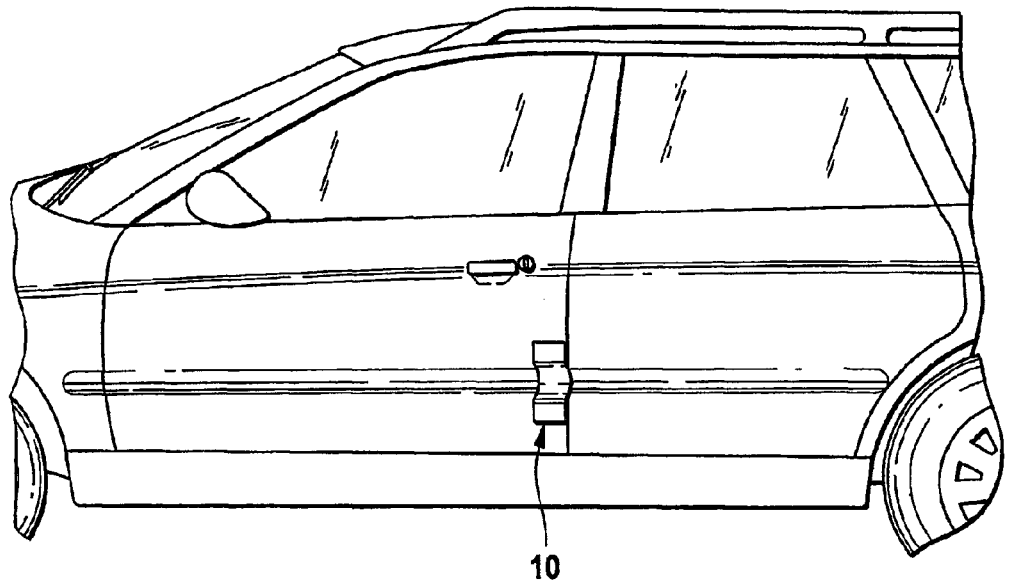
FIG. 4 is a picture of a vehicle comprising an edge guard installed on the edge of the vehicle door.

FIG. 4 shows a picture of a vehicle comprising an edge guard installed on the edge of the vehicle door. As can be seen on this picture, part of the bumper section extends over the edge of the vehicle door. If the door is opened and bumped against an obstacle, the part of the bumper section extending over the edge, wraps around the edge and protects not only the exterior surface of the vehicle door but also the lateral and the interior part of the edge.

The planar sections comprise a double backed adhesive tape 20 which adheres on the planar section and which comprises a release paper 22 on the opposite side. This release paper 22 is peeled off prior to the installation on the vehicle door.

The edge guard is formed from a resilient, low density polymeric material. A variety of polymeric materials may be used including polyurethane, polytherephthlate, polyvinylchloride, polystyrene, polyolefines, their copolymers and mixtures thereof. The preferred embodiment of the edge guard 10 is formed from polyethylene, which provides the least damaging to the edge of the vehicle door or the like during installation and removal of the edge guard 10.

The polymeric material is flexible and resilient. Preferably, the polymeric material is a foam having a density of 25–35 kg/m$^3$. The cell size of the foam is between 200 and 400 cells per cm$^3$. The stress strain characteristic of such a foamed material is about 40% compression when a force of between 0.056 to 0.104 N/mm$^2$ is applied. The material is compressed to 50% respectively 70% of its initial thickness if a force of between 0.077 to 0.143 N/mm$^2$ respectively 0.154 to 0.286 N/mm$^2$ is applied.

The relative dimensions of the edge guard 10 are first determined by the size of the extrusion die chosen. In the preferred embodiment, the edge guard 10 has an overall length l of 160 to 200 mm. The width w of the planar sections is about 50–70 mm. By placing the edge guard 10 at strategic locations along the edge of a vehicle door or the like, such a length is sufficient to provide adequate protection to the edge of a vehicle door or the like.

The edge guard is made by conventional methods. The polymeric material is extruded and foamed, the double backed adhesive tape is applied onto the planar sections and the extrudent is cut or punched into predetermined lengths to create a final polymeric edge guard 10. The polymeric edge guard 10 may then be used for removable installation on an edge of a vehicle door or the like.

It is to be understood that the embodiments of this invention as shown and described are preferred examples and that the invention is not limited to the exact arrangements shown in the accompanying drawings or described in the specification. Various changes in the details of the construction and shape of the elements of the preferred embodiment may be made without departing from the spirit of the invention.

What is claimed is:

1. An edge guard of polymeric material for removable installation on a vehicle door having a trim, said edge guard comprising:

a bumper section and two planar sections, each adjoining to said bumper section, said bumper section comprising a U-shaped portion conceived to bridge said trim of said vehicle door, said planar sections comprising means to removable install said guard on said edge of a vehicle door whereby said bumper section is curved in a direction perpendicular to the plane formed by the two planar sections and further curved in the plane formed by the two planar sections so as to form a crescent shape, thereby laterally extending over said edge of said vehicle door.

2. The edge guard of claim 1, wherein said means to removably install said guard on said edge of said vehicle door comprise an adhesive material.

3. The edge guard of claim 1, wherein said means to removably install said guard on said edge of said vehicle door comprise a double backed adhesive tape.

4. The edge guard of claim 1, wherein said polymeric material is chosen from the group consisting of polyurethane, polyterephthlate, polyvinyl-chloride, polystryrene, polyolefines, their copolymers and mixtures thereof.

5. The edge guard of claim 1, wherein said polymeric material comprises low-density polyethylene foam.

* * * * *